United States Patent
Chen et al.

(10) Patent No.: US 10,167,850 B2
(45) Date of Patent: Jan. 1, 2019

(54) SYSTEMS, METHODS AND APPARATUS FOR IMPROVED ENERGY MANAGEMENT SYSTEMS WITH SECURITY CONSTRAINED DYNAMIC DISPATCH FOR WIND POWER MANAGEMENT

(71) Applicant: Siemens Industry, Inc., Alpharetta, GA (US)

(72) Inventors: Dingguo Chen, Eden Prairie, MN (US); Matthew Jay Mathine, Plymouth, MN (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 457 days.

(21) Appl. No.: 14/853,082

(22) Filed: Sep. 14, 2015

(65) Prior Publication Data

US 2016/0273518 A1  Sep. 22, 2016

Related U.S. Application Data

(60) Provisional application No. 62/044,569, filed on Sep. 2, 2014.

(51) Int. Cl.
| | | |
|---|---|---|
| F03D 7/04 | (2006.01) | |
| H02J 3/38 | (2006.01) | |
| H02J 3/00 | (2006.01) | |

(52) U.S. Cl.
CPC ............. *F03D 7/045* (2013.01); *F03D 7/048* (2013.01); *H02J 3/386* (2013.01);
(Continued)

(58) Field of Classification Search
CPC .......... F03D 7/045; F03D 7/048; H02J 3/386; H02J 2003/007; Y02E 60/76;
(Continued)

(56) References Cited

U.S. PATENT DOCUMENTS 6,021,402 A * 2/2000 Takriti .................. G06Q 10/06
700/28
8,972,070 B2   3/2015 Sun et al.
(Continued)

OTHER PUBLICATIONS

Wind Energy Management System Integration Project. Article. [online]. YV Makarov. [retrieved on Apr. 27, 2018]. Retrieved from internet: <URL: https://www.pnnl.gov/main/publications/external/technical_reports/PNNL-19083.pdf> (Year: 2009).*

(Continued)

*Primary Examiner* — Robert E Fennema
*Assistant Examiner* — Marzia T Monty

(57) ABSTRACT

Embodiments provide systems, methods and apparatus for controlling an energy delivery system including providing an energy management system (EMS) including a wind power management (WPM) system, the WPM system including a WPM application that includes a security constrained dynamic dispatch (SCDD) application; receiving input data within the SCCD application, the data including real time telemetry and dynamic unit parameters, schedule input data, and critical constraint data; validating the input data for consistency to avoid infeasibilities; pre-processing the validated input data to determine parameters including a total generation amount to be dispatched; formulating an optimization model based on the parameters and data structures storing the validated input data; executing an optimization process on the optimization model to compute a solution; post-processing the solution to determine economic basepoints; and using the determined economic basepoints in controlling operation of the energy delivery system. Numerous other aspects are provided.

7 Claims, 5 Drawing Sheets

(52) U.S. Cl.
CPC ..... *F05B 2270/20* (2013.01); *H02J 2003/007* (2013.01); *Y02E 10/723* (2013.01); *Y02E 10/763* (2013.01); *Y02E 60/76* (2013.01); *Y02P 70/523* (2015.11); *Y04S 40/22* (2013.01)

(58) Field of Classification Search
CPC ..... Y02E 10/763; Y02E 10/723; Y04S 40/22; F05B 2270/20; Y02P 70/523
See application file for complete search history.

(56) References Cited

U.S. PATENT DOCUMENTS

| | | | | |
|---|---|---|---|---|
| 2004/0264083 | A1* | 12/2004 | Mansingh | H02J 3/00 361/62 |
| 2005/0033481 | A1* | 2/2005 | Budhraja | H02J 3/008 700/286 |
| 2011/0071690 | A1 | 3/2011 | Sun | |
| 2011/0196546 | A1* | 8/2011 | Muller | H02J 3/383 700/295 |
| 2013/0030784 | A1* | 1/2013 | Viassolo | G06Q 10/00 703/18 |

OTHER PUBLICATIONS

Microsoft computer dictionary. Dictionary. [online]. YV Makarov. Fifth edition. p. 378. [retrieved on Apr. 27, 2018]. Retrieved from internet: <URL: https://burmastarrecords.files.wordpress.com/2009/12/microsoft_computer_dictionary_fifth_edition1.pdf> (Year: 2009).*

\* cited by examiner

SYSTEMS, METHODS AND APPARATUS FOR IMPROVED ENERGY MANAGEMENT SYSTEMS WITH SECURITY CONSTRAINED DYNAMIC DISPATCH FOR WIND POWER MANAGEMENT

RELATED APPLICATIONS

The present application claims priority to U.S. Provisional Application No. 62/044,569 titled "Security Constrained Dynamic Dispatch System for Wind Power Management" filed Sep. 2, 2014, which is incorporated herein by reference for all purposes.

FIELD

The present invention relates to operating energy delivery systems, and more specifically to improved energy management systems with security constrained dynamic dispatch for wind power management.

BACKGROUND

An energy management system (EMS) is a system of computer implemented tools used by operators of electric utility grids to monitor, control, and optimize the performance of the generation and/or transmission of an energy delivery system. In other words, an EMS optimizes, supervises and controls the transmission grid and generation assets. The monitoring and control functions are known as "supervisory control and data acquisition" (SCADA). Control of such a system involves autonomous automatic control actions by the EMS to arrest deviations in power system frequency whenever imbalances arise between load and generation.

Primary frequency control actions include governor response, load damping, and voluntary frequency-responsive load control, all of which contribute to frequency response. Secondary frequency control involves centrally coordinated control actions by the EMS to return frequency to its scheduled value. The control actions are deployed both during normal operations and after primary frequency control resources have arrested frequency imbalance following major disturbances. Secondary frequency control actions include generation (or load) that responds to automatic generation control (AGC) signals or to operator dispatch commands. AGC is often referred to as "regulation" service.

There are a number of unique challenges to supplying electricity: production must be simultaneous with demand; demand varies greatly over the course of a day, week, and season; the costs of operating different types of generating units vary greatly; and both expected and unexpected conditions on the transmission network affect which generating units can be used to serve load reliably. Conventional security constrained economic dispatch (SCED) is an optimization process that takes into account these factors in selecting the generating units to dispatch, in order to deliver a reliable supply of electricity at the lowest cost possible under given conditions.

There are typically two stages, or time periods, to the economic dispatch process: day-ahead unit commitment (i.e., planning for tomorrow's dispatch) and unit dispatch (i.e., dispatching the system in real time). In the day-ahead unit commitment stage, operators must decide which generating units should be committed to be on-line for each hour, typically for the next 24-hour period (hence the term "day-ahead"), based on the load forecast. In selecting the most economic generators to commit, operators must take into account each unit's physical operating characteristics, such as how quickly output can be changed, maximum and minimum output levels, and the minimum time a generator must run once it is started. Operators must also take into account generating unit costs, such as fuel and non-fuel operating costs and costs of environmental compliance.

In addition, forecasted conditions that can affect the transmission grid must also be taken into account to ensure that the optimal dispatch can meet load reliably. This is the "security constrained" aspect of the commitment analysis. In other words, the optimization process is constrained by requirements that insure the system functions safely and reliably. Factors that can affect grid capabilities include generation and transmission facility outages, line capacities as affected by loading levels and flow direction, and the weather. If the security analysis indicates that the optimal economic dispatch cannot be carried out reliably, relatively expensive generators may have to be used in place of less expensive to operate units or resources.

In the real time unit dispatch stage, operators must decide in real time the level at which each available resource (e.g., as identified during the day-ahead unit commitment stage) should be operated, given the actual load and grid conditions, such that reliability is maintained and overall production costs are minimized. Actual conditions will vary from those forecasted in the day ahead commitment and operators must adjust the dispatch accordingly. In addition, transmission flows must be monitored to ensure flows stay within reliability limits and voltage within reliability ranges. If transmission flows exceed accepted ranges, the operator must take corrective action, which could involve curtailing schedules, changing the dispatch, or shedding load.

The proliferation of renewable energy and particularly wind power, present significant challenges to EMSs and energy market management systems (EMMS). Because these energy sources are frequently intermittent, it can be difficult to incorporate the energy they produce into existing power distribution systems that are designed to provide continuous, reliable power. Thus, there is a significant need to provide systems, methods and apparatus for improved energy management systems with security constrained dynamic dispatch for wind power management.

SUMMARY

In some embodiments, a method of controlling an energy delivery system is provided. The method includes providing an energy management system (EMS) communicatively coupled to a plurality of generating units including wind power generating units, the EMS including a wind power management (WPM) system, the WPM system including a WPM application that includes a security constrained dynamic dispatch (SCDD) application; receiving input data within the SCCD application, the data including real time telemetry and dynamic unit parameters, schedule input data, and critical constraint data; validating the input data for consistency to avoid infeasibilities; pre-processing the validated input data to determine a first set of parameters including a total generation amount to be dispatched and additional parameters; formulating an optimization model based on the first set of parameters and one or more data structures storing the validated input data; executing an optimization process on the optimization model to compute a solution; post-processing the solution to determine each unit's economic basepoints; and using the determined economic basepoints in controlling operation of the energy delivery system.

In other embodiments, an energy management system (EMS) is provided. The EMS includes a process controller; a memory coupled to the process controller and storing instructions executable on the process controller, the instructions operable to cause the processor to: receive input data within a SCCD application, the data including real time telemetry and dynamic unit parameters, schedule input data, and critical constraint data; validate the input data for consistency to avoid infeasibilities; pre-process the validated input data to determine a first set of parameters including a total generation amount to be dispatched and additional parameters; formulate an optimization model based on the first set of parameters and one or more data structures storing the validated input data; execute an optimization process on the optimization model to compute a solution; post-process the solution to determine economic basepoints for generation units in an energy delivery system; and use the determined economic basepoints in controlling operation of the energy delivery system.

In still other embodiments, a computer implemented security constrained dynamic dispatch (SCDD) application for a wind power management (WPM) system within an energy management system (EMS) is provided. The SCDD application includes: a data collection function module operative to receive input data within the SCCD application, the data including real time telemetry and dynamic unit parameters, schedule input data, and critical constraint data; a data validation function module operative to validate the input data for consistency to avoid infeasibilities; a data pre-processing function module operative to pre-process the validated input data to determine a first set of parameters including a total generation amount to be dispatched and additional parameters; an optimization model formulation function module operative to formulate an optimization model based on the first set of parameters and one or more data structures storing the validated input data; a solution function module operative to execute an optimization process on the optimization model to compute a solution; and a result post-processing function module operative to post-process the solution to determine economic basepoints for generation units in an energy delivery system.

Numerous other aspects are provided in accordance with these and other aspects of the invention. Other features and aspects of the present invention will become more fully apparent from the following detailed description, the appended claims and the accompanying drawings.

DESCRIPTION

Figure 1:
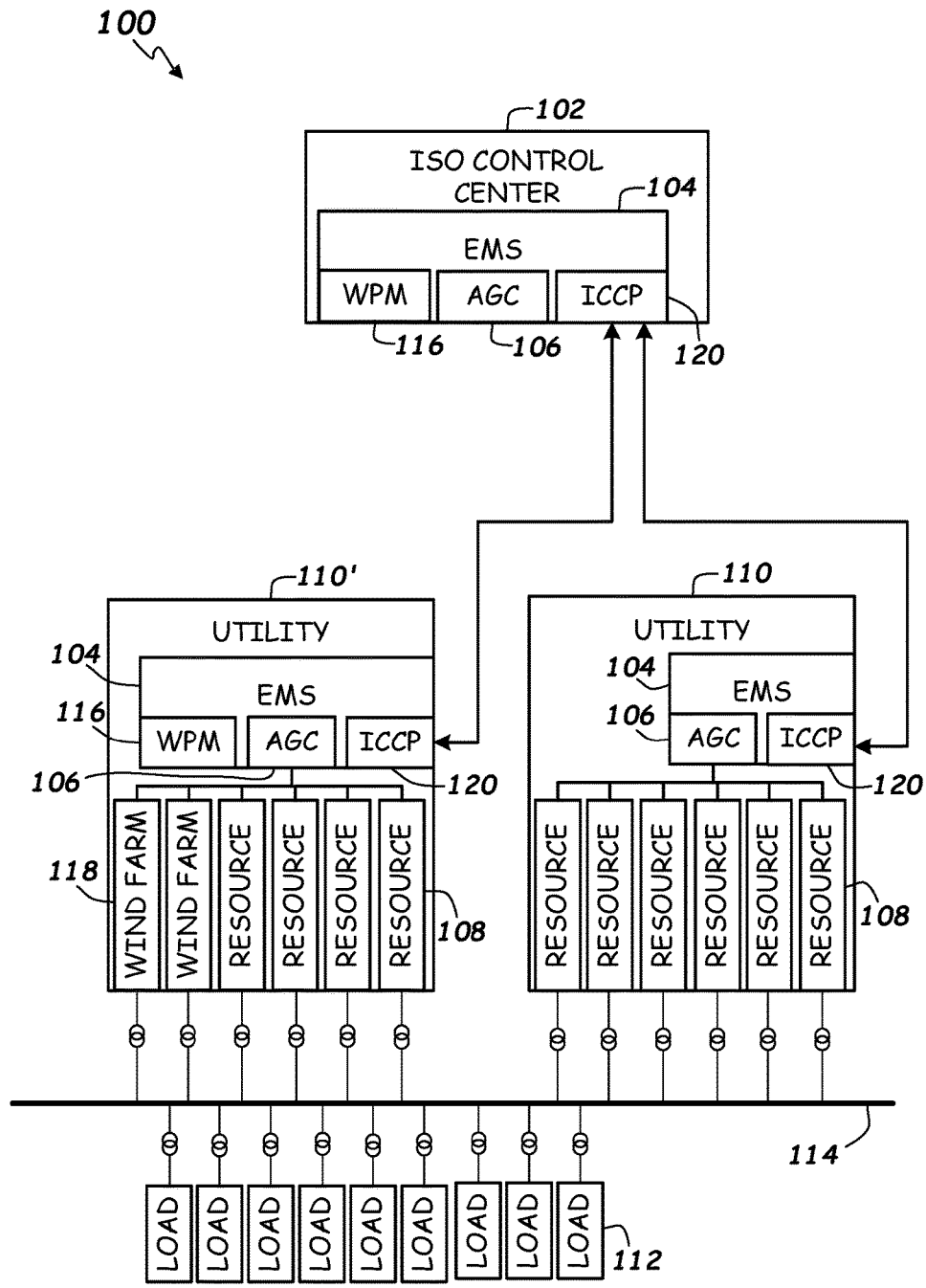
FIG. 1 is a block diagram depicting a portion of an example energy delivery system according to embodiments of the present invention.

Embodiments of the present invention provide systems, apparatus and methods for an improved energy management system (EMS) for electricity delivery, or more generally, energy delivery systems. Embodiments of the present invention include software applications and systems adapted to provide a wind power management (WPM) system within the EMS that provides security constrained dynamic dispatch (SCDD). The SCDD application is responsible for economically dispatching active power generation of all types of resources including wind farms subject to system, resource and network constraints over multiple time intervals in a manner such that as much as wind power can be injected the power grids without degrading system security and yet achieve the best possible system overall economics over the dispatch horizon.

The SCDD application within the WPM system includes several embodiments. When the dispatch horizon that typically includes multiple consecutive time intervals, reduces to a single time interval, the SCDD application reduces to security constrained economic dispatch (SCED). When the network constraints are not considered, the SCDD application reduces to conventional economic dispatch (ED).

The SCDD application within the WPM system operates in conjunction with an automatic generation control (AGC) system (e.g., a suite of applications). The SCDD application conducts grid-security related optimization processes and determines the basepoints for wind farms. These basepoints are stored in a WPM operational database. In addition, these basepoints will also be updated to a real-time AGC database. Then the AGC system, in particular a load frequency control (LFC) application, retrieves these basepoints from the AGC real-time database and performs further processing to compute setpoints for all the AGC generating resources including wind farms. The LFC then sends out the setpoints to respective remote terminal units (RTU's) via a communication front end (CFE) or an inter-control center protocol (ICCP).

The SCDD application for the WPM system is configurable in the sense that the dispatch time interval and dispatch time horizon can be configured for any desired dispatch horizon (e.g., 15 minutes, 1 hour, etc.) with an appropriate interval (e.g., 1 minute, 5 minutes, etc.). The dispatch horizon ranges from several minutes to a few hours. The time interval ranges from 1 minute to several minutes.

In various embodiments, the SCDD application for the WPM system provides a number of features including taking into consideration the maximum allowed system wind generation for integration by enforcing the maximum wind generation allowable for integration obtained from a process of maximizing wind generation and minimizing wind generation loss based on a probabilistic approach. In addition, the maximum allowed wind farm's wind power generation is considered by enforcing the wind dispatch results obtained from the process of maximizing wind generation and minimizing wind generation loss based on a probabilistic approach.

The SCDD application also provides an optimization process that ensures that the power grid's security is not compromised and properly dispatches a mix of market resources that are bid-based and non-market resources that are cost based. Further, options for the objective function include minimizing total system cost and maximizing the use of renewable energy, especially wind power. The SCDD application can also co-optimize the energy, regulation and spinning reserve to meet power balance, regulation requirements and reserve requirements. The SCDD application can dispatch the dispatchable generating units over multiple consecutive time intervals in an optimal manner to minimize the system production cost based on the unit's piece-wise linear or stair-case incremental cost curves and the total area generation to be dispatched (GTBD). Further, plant/group limits are included when enabled, unit limits and response rates are respected, unit prohibited regions are considered, critical network security constraints are respected when enabled, and inter-temporal ramping constraints on dispatchable units are incorporated.

Along with an ever increasing penetration of large amount of renewable energy, especially wind power into the power grids around the world, existing EMSs and EMMSs require enhancements to manage, accommodate, and control wind power and other types of renewable energy (e.g., like solar power, run-of-river hydro power, etc.) to optimize economic and environmental benefits. With the common understanding that renewable energy resources are intermittent in nature, a large amount of renewable energy sources connected to the power grids presents a great challenge for the reliable operation of the power grids, and as a result, a substantially increased amount of reserve from traditional, fast start-up generating resources is made available. To secure the reliable operation of the power grids, there are times that only some of the renewable energy resources are allowed to connect to the grids. At other times, there is a priority to first use renewable energy, such as wind power, as much as possible up to the renewable energy sources' maximum capacities.

On the other hand, the conventional generating resources must also be properly dispatched together with renewable energy resources so that transmission congestion can be avoided, or mitigated, or eliminated if it exists. Typically in the EMS environment, the dispatch objective of the EMS control centers is to minimize the overall production cost for providing a certain amount of power generation. In the deregulated market environment, the dispatch objective of the Independent System Operators (ISO) control centers is to minimize the overall cost for procuring a certain amount power generation from bidding generators. In addition, there are also situations where traditional generating resources are providing power generating on a production cost basis while renewable energy resources are competing for provision of power generation based on their energy bids and the dispatch objective of the EMS control centers is to minimize the overall cost for providing a certain amount of power generation.

Furthermore, there is also a need for the control centers to be able to respond ahead of time when foreseeing system load build up toward a daily peak load or load going down toward a daily trough. This is why the dispatch horizon is set well ahead into the future but limited by the prediction accuracy of future system conditions. Typically the dispatch time interval is one to several minutes, and the dispatch horizon is several minutes up to a few hours.

The SCDD application for WPM can be implemented as a core application within the WPM system. The SCDD application meets the challenging needs of modern control centers and provides a number of functions. Specifically, these functions include supporting the dispatch needs of a market environment where market resources compete for supplying power generation; supporting the dispatch needs of traditional EMS control centers where non-market resources are dispatched based on production cost consideration; supporting the dispatch needs of EMS control centers where a mix of market resources and non-market resources must be dispatched properly; supporting the use of renewable energy, especially wind power; supporting co-optimization of energy and ancillary services; dispatch generating resources over multiple consecutive time intervals in an optimal manner; respecting critical network security constraints; and incorporating inter-temporal ramping constraints on dispatchable units.

Turning now to FIG. 1, a portion of an example energy deliver system 100 according to embodiments of the present invention is provided. Independent System Operators (ISO) 102 operate control centers that can include an EMS 104. The EMS 104 can include a number of hardware and software components for monitoring, controlling, and optimizing the performance (e.g., in terms of minimizing cost, maximizing efficiency, and maximizing reliability) of the generation and transmission of the energy delivery system 100.

The EMS 104 includes an automatic generation control (AGC) system 106 for adjusting the power output of multiple resources 108 (e.g., generators) at different power plants (e.g., utilities 110, independent power producers (IPP) and/or non-utility generators (NUG), etc.), in response to changes in the load created by consumers of the electricity. The generated power is delivered from the resources 108 to power consumers' loads 112 via transmission lines 114. Note that the utilities 110 can include an EMS 104 with an AGC system 106. Utilities 110' that include one or more wind farms 118 include a wind power management (WPM) application 116 as part of their EMS 104. To support such utilities 110', the ISO's EMS 104 also includes the WPM application 116. As will be described in detail below with respect to FIG. 2, the WPM application 116 includes a SCDD application. To facilitate communications and control between the EMSs 104, the EMSs 104 also implement an inter-control center protocol (ICCP) 120.

Embodiments of the present invention in the form of a WPM application 116 can be added to the AGC systems of existing commercially available EMS products such as the Spectrum Power 3™ and the Spectrum Power TG™ Energy Management Systems manufactured by Siemens Industry, Inc. of Washington, D.C.

Since a power grid requires that generation and load closely balance moment by moment, frequent adjustments to the output of resources 108 are continuously made. The balance can be judged by measuring the system frequency; if system frequency is increasing, more power is being generated than used, and the generators in the system 100 are accelerating. If the system frequency is decreasing, more load is on the system 100 than the instantaneous generation can provide, and the generators in the system 100 are slowing down.

Where the grid has tie interconnections to adjacent control areas, the AGC system 106 helps maintain the power interchanges over the tie lines at the scheduled levels. With computer-based control systems and multiple inputs, an AGC system 106 can take into account such matters as the most economical units to adjust, the coordination of thermal, hydroelectric, wind, and other generation types, and constraints related to the stability of the system and capacity of interconnections to other power grids.

Figure 2:
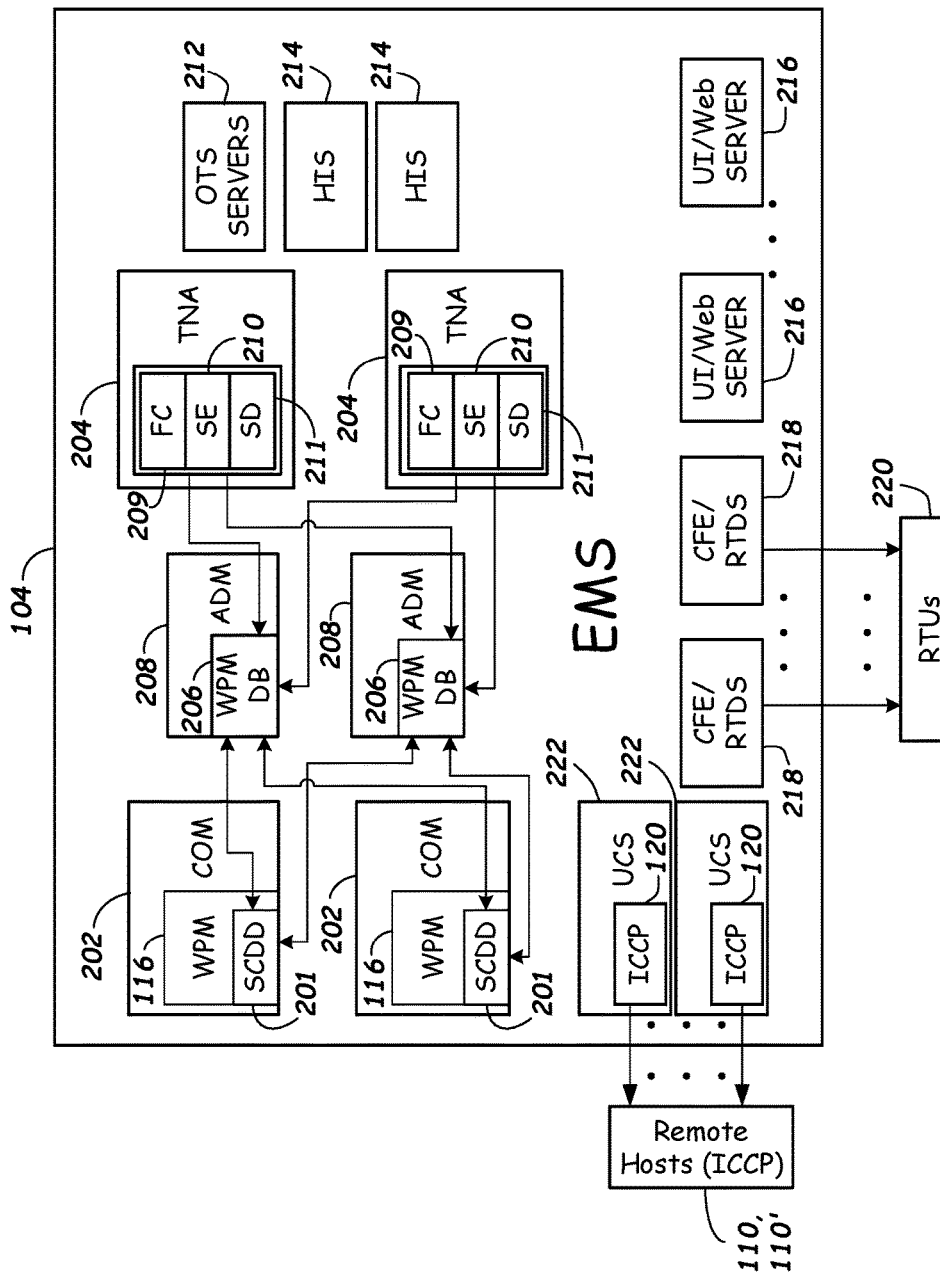
FIG. 2 is a block diagram of details of an example energy management system according to embodiments of the present invention.

Turning now to FIG. 2, an example configuration of an EMS 104 (e.g., an EMS 104 operated by an ISO) that supports operation of the WPM application 116, including an SCDD application 201, to control wind farms 118 according to embodiments of the present invention is shown. Embodiments of the EMS 104 can be implemented with a communicator (COM) server 202 (e.g., server implemented) that includes the SCDD application 201 for the WPM application 116. The EMS 104 can include one or more redundant back-up servers to provide higher reliability and fault-tolerance. Thus, as shown in FIG. 2, redundant standby servers are also provided. A administration (ADM) server 208 includes a WPM database 206 which is bi-directionally, commutatively coupled to the SCDD application 201 within the WPM application 116. A transmission network application (TNA) executes on a TNA sever 204 that includes applications adapted to feed data to the WPM database 206 via a communication link to the ADM server 208. In some embodiments, the applications on the TNA sever 204 include a fault calculation (FC) application 209; a state estimator (SE) application 210; and a security dispatch (SD) application 211. Embodiments of the EMS 104 can also include an operator training simulator (OTS) server 212, servers that implement a Historical Information System (HIS) 214, and user interface (UI)/web servers 216.

EMS 104 further includes one or more Utility Communication Servers 222 that each provide an implementation of an Inter-Control Center Communication Protocol (ICCP) 120 that enables communication with, for example, other EMSs in operation at, for example, several utilities 110, 110' (FIG. 1). In some embodiments, ICCP 120 can be used to implement remote control of resources 108 including wind farms 118 (FIG. 1) by implementing AGC system 106 communications between different EMSs. The EMS 104 also includes a communication front end (CFE)/Real Time Data Server (RTDS) 218 to facilitate communications with external entities and users via remote terminal units (RTUs) 220. Note that RTUs 220 are part of the power utilities' field devices, for example.

In operation, the ISO clears the real time market through its market optimization engine and then ISOs the dispatch instructions along with ancillary service awards (e.g., regulation, reserves, etc.) to individual power utilities through a transport mechanism (e.g., ICCP 120). The power utilities receive the dispatch instructions (e.g., via ICCP 120) and then make use of their AGC 106 to compute a power setpoint command for each AGC cycle for the resources under AGC control (i.e., AGC units). Next, the setpoints are updated to SCADA and they are then sent to the utilities' RTUs 220 via the CFE/RTDS 218. There are dedicated RTU lines that connect the RTUs to the CFE/RTDS 218 via, e.g., modems. Typically, RTUs are geographically located in the utilities' substations and hardwired to the resources (e.g., generators). The various applications such as, for example, AGC 106, SCADA, CFE/RTDS 218, and ICCP 120 are part of EMS 104. The RTUs 220 are field devices that are capable of sending telemetry to the ISO EMS 104 and can also receive megawatt (MW) setpoints from the ISO EMS 104 to control resources (e.g., generators).

The FC application 209 is operative to compute the voltage levels for the transmission nodes to which wind farms are connected after a three-phase short-circuit contingency is applied at carefully selected transmission nodes one at a time. These voltage levels are used to determine which wind farms trips. Then a process of maximizing wind power generation and minimizing wind power loss is conducted to determine the system allowed maximum wind power generation and each wind farm's maximum allowed wind power generation to achieve the security objective and the best system economic benefits. The SCDD application 201 will apply the wind farm's maximum allowed wind power generation as another limit in the process of finding the optimal economic basepoints for wind farms and other types of generating units. The SE application 210 and the SD application 211 provide the critical flow constraints and shift factors to the SCDD application 201 to incorporate them in the optimization process so that the resulting unit basepoints will be able to avoid, or relieve, or even eliminate transmission overloading.

The WPM application 116 contains several functions that work together in a coordinated manner. A Wind Power Control (WPC) function provides a three-phase short-circuit contingency list and request for the TNA server's FC application 209 to conduct post-fault voltage values for the WPC function interested transmission nodes; ranks the contingencies; conducts the maximization of system wind power generation; conducts the minimization of system wind power generation loss; and determines the system maximum allowed wind power generation that can be integrated into the power grid.

The WPM application 116 also includes a Wind Power Forecast (WPF) function operative to make use of weather forecast data, historical actual weather data, especially wind speed and wind direction, current actual weather data, historical wind farm actual MW output, current actual wind farm MW output; takes advanced adaptive forecasting techniques; and produces reasonable wind power forecast results on the system, zone, and wind farm levels.

The SCDD application 201 acquires the needed data for co-optimization of energy and ancillary services; optimally allocate generation on a mix of market resources and non-market resources over multiple consecutive time intervals in the dispatch horizon for the best system economics; and stores the needed results in the WPM database 206 and the real-time AGC database.

Figure 3:
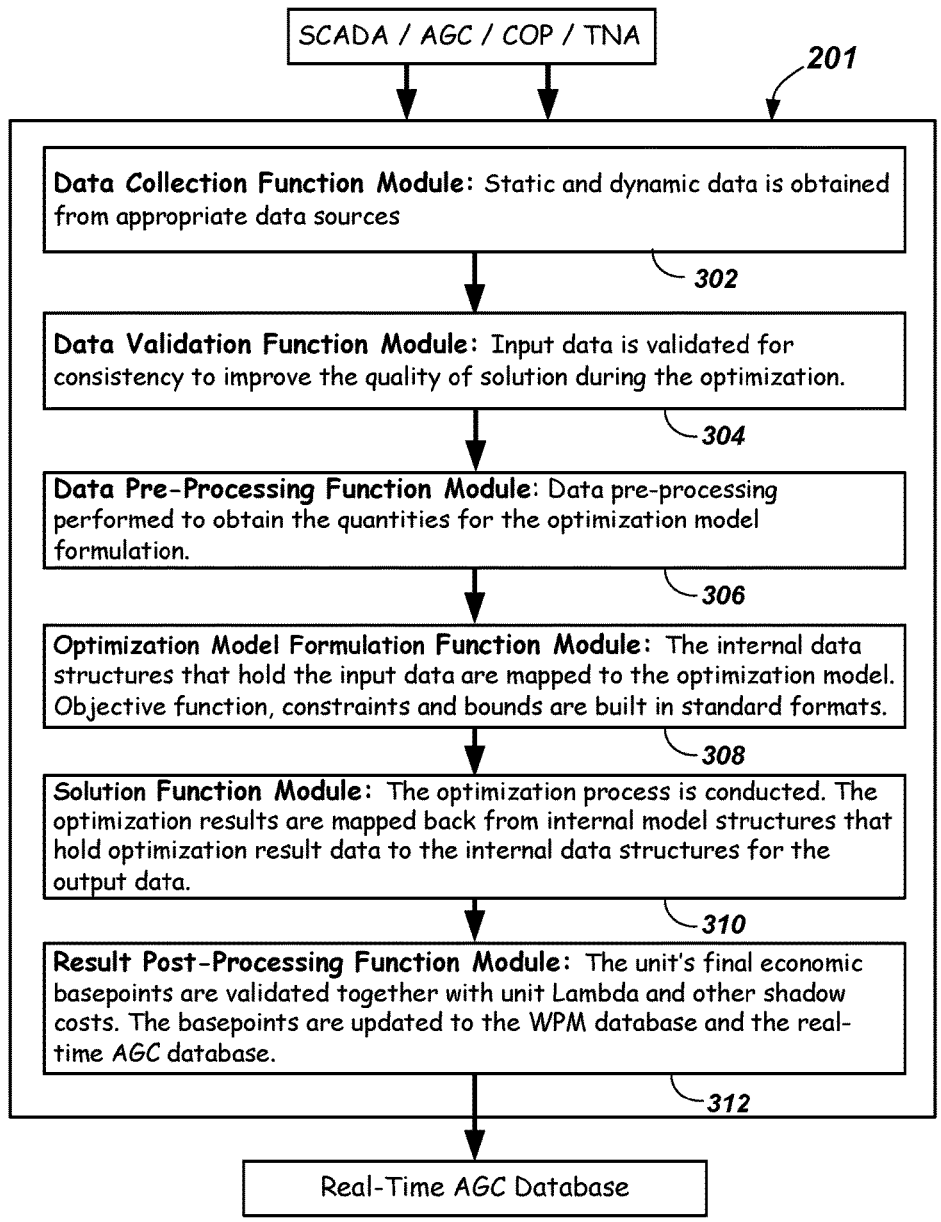
FIG. 3 is a block diagram depicting function modules of an example SCDD application for a wind power management system according to embodiments of the present invention.

The SCDD application 201 includes several function modules as shown in FIG. 3. These function modules work together in a coordinated manner and include a data collection function module 302, a data validation function module 304, a data pre-processing function module 306, an optimization model formulation function module 308, a solution function module 310, and a result post-processing function module 312.

The data collection function module 302 obtains static and dynamic data from appropriate data sources including an interface to the SCADA/AGC for input data which includes a real-time snapshot of telemetry and dynamic unit parameters; an interface to a Current Operating Plan (COP) which includes schedule input data; and an interface to the TNA server 204 which includes critical constraint input data.

The data validation function module 304 validates the input data for consistency to improve the quality of the solution computed during the optimization. This module ensures that the eventual optimization model formulation avoids infeasibilities due to bad input data.

The data pre-processing function module 306 performs extensive pre-processing after the input data has been validated. The pre-processing, performed prior to proceeding with the optimization model formulation can include determining the total generation to be dispatched along with any AS requirements for each time interval of the dispatch horizon; determining the list of generating units that will participate in the dispatch, along with their operating modes for each time interval of the dispatch horizon; determining the effective dispatch limits of each participating generating unit for each time interval of the dispatch horizon; determining the effective ramp rates of each participating generating unit for each time interval of the dispatch horizon; determining the resulting price/cost curve of each participating generating unit for each time interval of the dispatch horizon; determining the initial MW of each participating generating unit for each time interval of the dispatch horizon; and determining the list of network critical constraints to be considered during dispatch, along with their limits and shift factors for each time interval of the dispatch horizon.

The optimization model formulation function module 308 is operative to map the internal data structures that hold the input data to the optimization model. In addition, internal indexes are built for fast access between internal data structures and internal model structures for the optimization model. The optimization model formulation function module 308 also builds the objective function, constraints and bounds in the standard formats.

The solution function module 310 executes the optimization process. The optimization results are mapped back from internal model structures that hold optimization result data to the internal data structures for the output data.

The result post-processing function module 312 processes the solution of the optimization to determine the unit's final economic basepoints after the optimization has completed. The results of the post-processing will be written to the SCDD application 201 output tables of the WPM database 206. Exception handling is also conducted in cases where infeasibilities occur in the optimization process. The unit economic basepoints for the binding interval are also updated to the real-time AGC database in the case of a real-time user.

Embodiments of the present invention provide an optimization approach that ensures security and economics over multiple time intervals. Recent years have witnessed a rapid growth in wind power generation year over year all over the world. As noted above, integrating as much wind generation as possible without compromising the power grid's security has been a great challenge. Embodiments of the present invention provide for addressing both security and economics aspects in a coordinated manner.

The "security" considered herein is two-fold. First, embodiments maximize wind power generation with the consideration to lose as little wind generation as possible in post-contingency scenarios where multiple carefully selected three-phase short-circuit contingencies have occurred with appropriate probabilities; and such determined wind farm's maximum allowed generation is used in the SCDD application as part of wind farm's limit processing, which will be enforced during the SCDD optimization process so that the wind farm's economic basepoints will not compromise the power grid security.

Second, the security dispatch application of the transmission network application identifies transmission branches and/or corridors that are overloaded based on the power system conditions estimated by the state estimator application of the transmission network application. These critical flow constraints are incorporated into the SCDD application in real time to determine the best unit movements that can mitigate or eliminate transmission congestion and yet achieve the best system economics.

The SCDD application makes the best unit movements in response to the current and future power system conditions where future system load demand is predicted by Short Term Load Forecast (STLF) and future wind power generation is predicted by the Wind Power Forecast. Since the predicted system conditions are used for the multiple time-interval dispatch, if the predicted system conditions are reasonably close to the actual system conditions, the SCDD application results would provide the best results in attaining the target that comprises both the security and economics.

In considering the economics, the generating unit's incremental cost curves are constructed from respective incremental heat rate curves or incremental water rate curves for units that are not market resources; for market resources, energy bid price curves are used directly. For wind farms, some equivalent incremental cost curves are provided if they do not participate in the energy market or their energy bid price curves are used if they are market resources. Piecewise linear or staircase cost curves are supported.

In correspondence to each linear or flat segment of these incremental cost curves, variables are defined with bounds being low-end and high-end values of the segment as if they are independent of each other. On the other hand, variables associated with the same incremental cost curve are related together to determine the underlying unit's total active power as the sum. The present inventors have noticed that when one or more of the incremental cost curves contain a linear, monotonically increasing segment, one or more quadratic terms in the expression of the system objective function results, a sum of unit's production cost over all units and over all time intervals.

In the market environment, the locational marginal price (LMP) is determined for each unit. The LMP can be split into three components: the market clearing price component, the loss component, and the transmission congestion component. Similarly, for the EMS environment of embodiments of the present invention, the concept of locational marginal incremental cost (LMIC) is introduced. The LMIC is split into three components in a similar manner as the LMP: the system incremental cost component, the loss component, and the transmission congestion component.

The optimization problem can be thought of as minimizing the system production cost over all participating units and over all time intervals in the dispatch horizon subject to a number of categories of constraints. These categories include power system balance constraints, system regulation requirements, system reserve requirements, unit dispatch limits, unit regulation limits, unit reserve limits, unit ramp rate limits, unit prohibited regions, power plant/group limits, critical flow limits, wind farm's security limits which are considered in processing of unit dispatch limits.

Mathematically, the security constrained dynamic dispatch problem (solved by the SCDD application) that includes both market resources (e.g., conventional generating resources and renewable energy resources) and non-market resources (e.g., conventional generating resources and renewable energy resources), and provides co-optimization of energy and ancillary services including regulation and spinning reserve, can be represented by:

Minimize $J=\Sigma_t\Sigma_i C_{i,t}(x_{i,t})$, subject to the following constraints:
Power Balance: $\Sigma_i(1-\alpha_{i,t})x_{i,t}=GTBD_t$ for any time interval t within the time horizon where i indexes the dispatchable generating units; t designates the time interval; $x_{i,t}$ the power basepoint of unit i for time interval t; $GTBD_t$ the generation to be dispatched for time interval t; $\alpha_{i,t}$ the generation loss sensitivity associated with unit i for time interval t.
System Regulation Requirement: $\Sigma_i q_{i,t}^+ - q_{i,t}^- = REG_t$ for any time interval t within the time horizon where $q_{i,t}^+$ and $q_{i,t}^-$ designate the upward and downward regulation contributions of unit i for time interval t; $REG_t$ the system regulation requirement for time interval t.

System Reserve Requirement: $\Sigma_i r_{i,t} \geq RTBD_t$ for any time interval t within the time horizon where $r_{i,t}$ designates the reserve contribution of unit i for time interval t; $RTBD_t$ the system reserve requirement for time interval t.

Unit Limits: $\underline{P}_{i,t} \leq x_{i,t} \leq \overline{P}_{i,t}$ for any unit i and for any time interval t where $\underline{P}_{i,t}$ and $\overline{P}_{i,t}$ represent the unit's high and low dispatch limits for time interval t. It is worth pointing out that for wind farms, the maximum allowed wind generation determined in the Wind Power Control is processed and incorporated in the unit dispatch limit. For study, the forecasted wind power of a wind farm is also processed and incorporated in the unit dispatch limit.

Unit Reserve and Regulation Contribution: $\underline{P}_{i,t}^{reg} \leq x_{i,t} + q_{i,t}^+ - q_{i,t}^- + r_{i,t} \leq \overline{P}_{i,t}^{reg}$ for any unit i and for any time interval t where $\underline{P}_{i,t}^{reg}$ and $\overline{P}_{i,t}^{reg}$ represent the unit's high and low regulating limits for time interval t. Typically, the unit's regulating high limit is above (or at least identical to) its dispatch high limit; and the unit's regulating low limit is below (or at most identical to) its dispatch low limit.

Unit Regulation Up Limits: $0 \leq q_{i,t}^+ \leq \overline{Q}_{i,t}^+$ for any unit i and for any time interval t where $\overline{Q}_{i,t}^+$ represents the unit's maximum upward regulation contribution for time interval t.

Unit Regulation Down Limits: $0 \leq q_{i,t}^- \leq \overline{Q}_{i,t}^-$ for any unit i and for any time interval t where $\overline{Q}_{i,t}^-$ represents the unit's maximum downward regulation contribution for time interval t.

Unit Reserve Limits: $0 \leq r_{i,t} \leq \overline{S}_{i,t}$ for any unit i and for any time interval t where $\overline{S}_{i,t}$ represents the unit's maximum reserve contribution for time interval t.

Unit Ramp Rate Limits: $\underline{RRL}_{i,t} \leq x_{i,t+1} - x_{i,t} \leq \overline{RRL}_{i,t}$ for any unit i and for any time interval t where $\underline{RRL}_{i,t}$ and $\overline{RRL}_{i,t}$ represent the unit's downward and upward ramp rate limit per time interval, respectively.

Plant Limit: $\Sigma_{i \in S_k} x_{i,t} \leq \overline{PL}_{k,t}$ for any plant k and for any time interval t where $S_k$ designates the set of units belonging to plant k; $\overline{PL}_{k,t}$ the plant high limit of plant k for time interval t.

Critical Constraints: $\underline{f}_{j,t} \leq \hat{f}_{j,t} + \Sigma_i \beta_{i,j}(x_{i,t} - \hat{x}_{i,t}) \leq \overline{f}_{j,t}$ for any critical flow constraint j and for any time interval t where $\underline{f}_{j,t}$ and $\overline{f}_{j,t}$ designate the flow low and high limits, respectively; $\hat{f}_{j,t}$ the transmission branch (or corridor) i's base flow determined by Network Application (State Estimator) or actual power flow if available; $\hat{x}_{i,t}$ the unit i's base power determined by Network Application (State Estimator) or the unit's actual power if available; $\beta_{i,j}$ the unit i's generation shift factor with respect to the transmission branch (or corridor) j.

Note that some of the above constraints are ranged constraints (i.e., constrained by a range of values) and associated with negative lower bounds and positive upper bounds. In some embodiments, for the convenience of CPLEX programming for example, some manipulation is done to handle these constraints. In particular, the unit ramp rate limits are manipulated as follows:

Define $\Delta x_{i,t+1} = x_{i,t+1} - x_{i,t} - \underline{RRL}_{i,t}$. Then the new constraint looks like $x_{i,t+1} - x_{i,t} - \Delta x_{i,t+1} = \underline{RRL}_{i,t}$ with the bound conditions $-0 \leq \Delta x_{i,t+1} \leq \overline{RRL}_{i,t} - \underline{RRL}_{i,t}$.

Similarly the critical flow constraints are transformed to the following:

Define $f_{j,t} = \hat{f}_{j,t} + \Sigma_i \beta_{i,j}(x_{i,t} - \hat{x}_{i,t}) - \underline{f}_{j,t}$. Then the new constraints look like $\Sigma_i \beta_{i,j} x_{i,t} - f_{j,t} = \Sigma_i \beta_{i,j} \hat{x}_{i,t} - \hat{f}_{j,t} + \underline{f}_{j,t}$ with the bound conditions $-0 \leq f_{j,t} \leq \overline{f}_{j,t} - \underline{f}_{j,t}$.

If some of the line flow capacity is reserved, then the line flow limits are adjusted. Let $f_{j,t}^{ResCap}$ denote the reserved line flow capacity. Then the high and low flow limits must be adjusted to $\overline{f}_{j,t} - |f_{j,t}^{ResCap}|$ and $\underline{f}_{j,t} + |f_{j,t}^{ResCap}|$. Consequently the new constraints look like $\Sigma_i \beta_{i,j} x_{i,t} - f_{j,t} = \Sigma_i \beta_{i,j} \hat{x}_{i,t} - \hat{f}_{j,t} + \underline{f}_{j,t} + f_{j,t}^{ResCap}$ with the bound conditions $-0 \leq f_{j,t} \leq \overline{f}_{j,t} - \underline{f}_{j,t} - 2|f_{j,t}^{ResCap}|$.

The unit reserve and regulation contribution constraints, if manipulated as above, are transformed to the following:

Define $x_{i,t}^d = x_{i,t} + q_{i,t}^+ - q_{i,t}^- + r_{i,t} - \underline{P}_{i,t}^{reg}$. Then the new constraints look like $x_{i,t} + q_{i,t}^+ - q_{i,t}^- + r_{i,t} - x_{i,t}^d = \underline{P}_{i,t}^{reg}$ with the bound conditions $-0 \leq x_{i,t}^d \leq \overline{P}_{i,t}^{reg} - \underline{P}_{i,t}^{reg}$.

While the concept of locational marginal price (LMP) is closely tied to the market environment, in the EMS environment of embodiments of the present invention, a similar notion that reflects the location based shadow cost is developed here for convenient reference and comparison. This is called locational marginal incremental cost (LMIC). Even though the notions are different, mathematically representing them is similar.

Let $\lambda_t$ be the Lagrange multiplier (or shadow cost) associated with the power balance for the time interval t; $\pi_t$ the Lagrange multiplier (or shadow cost) associated with the regulation balance for the time interval t; $\mu_t$ the Lagrange multiplier (or shadow cost) associated with the reserve requirement inequality for the time interval t; $\gamma_{k,t}$ the Lagrange multiplier (or shadow cost) associated with the plant limit for plant k for the time interval t; $\rho_{j,t}$ the Lagrange multiplier (or shadow cost) associated with the flow constraint j for the time interval t; $\delta_{i,t}$ the Lagrange multiplier (or shadow cost) associated with the regulating limits of unit i for the time interval t; $\zeta_{i,t}$ the Lagrange multiplier (or shadow cost) associated with the ramping constraints of unit i for the time interval t. The Lagrange function can be given as follows:

$$J_L = \Sigma_t \Sigma_i C_{i,t}(x_{i,t}) + \Sigma_t \lambda_t (GTBD_t - \Sigma_i (1-\alpha_{i,t}) x_{i,t}) + \Sigma_t \pi_t (REG_t - \Sigma_i (q_{i,t}^+ - q_{i,t}^-)) + \Sigma_t \mu_t (RTBD_t - \Sigma_i r_{i,t}) + \Sigma_t \Sigma_k \gamma_{k,t} (\overline{PL}_{k,t} - \Sigma_{i \in S_k} x_{i,t}) + \Sigma_t \Sigma_j \rho_{j,t} (\hat{f}_{j,t} + \Sigma_i \beta_{i,j}(x_{i,t} - \hat{x}_{i,t}) - f_{j,t} - \underline{f}_{j,t}) + \Sigma_t \Sigma_i \delta_{i,t} (x_{i,t} + q_{i,t}^+ - q_{i,t}^- + r_{i,t} - \underline{P}_{i,t}^{reg} - x_{i,t}^d) + \Sigma_t \Sigma_i \zeta_{i,t} (x_{i,t+1} - x_{i,t} - \underline{RRL}_{j,t} - \Delta x_{i,t+1})$$

Then for time interval t, for any marginal unit i, the following holds:

$$0 = \frac{\partial J_L}{\partial x_{i,t}} = \frac{\partial C_{i,t}(x_{i,t})}{\partial x_{i,t}} - \lambda_t(1 - \alpha_{i,t}) - \gamma_{k,t} + \sum_j \rho_{j,t} \beta_{i,j} + \delta_{i,t} - \zeta_{i,t} + \delta_{i,t-1},$$

(Note that $\zeta_{i,0}=0$ is introduced to make the equality hold for all time intervals), $$0 = \frac{\partial J_L}{\partial q_{i,t}^+} = -\pi_t + \delta_{i,t},$$

$$0 = \frac{\partial J_L}{\partial q_{i,t}^-} = \pi_t - \delta_{i,t},$$

(The above two equalities never hold simultaneously for the same unit and for the same time interval, but they both lead to the same equation: $\delta_{i,t} = \pi_t$), $$0 = \frac{\partial J_L}{\partial r_{i,t}} = -\mu_t + \delta_{i,t}.$$

Then the marginal unit's incremental cost may be determined as follows:

$$\frac{\partial C_{i,t}(x_{i,t})}{\partial x_{i,t}} = \lambda_t(1-\alpha_{i,t}) + \gamma_{k,t} - \delta_{i,t} + \zeta_{i,t} - \zeta_{i,t-1} - \sum_j \rho_{j,t}\beta_{i,j}$$

If no constraints are binding except for the power balance and no loss is considered, then $$\frac{\partial C_{i,t}(x_{i,t})}{\partial x_{i,t}} = \lambda_t$$

for EMS environment or $MCP_t = \lambda_t$ for market environment as the energy market clearing price.

The transmission congestion component of the incremental cost can be read off from the above equation:

$LMIC_{i,t}^{congest} = -\Sigma_j \rho_{j,t} \beta_{i,j}$ for EMS environment or $LMP_{i,t}^{congest} = -\Sigma_j \rho_{j,t} \beta_{i,j}$ for market environment (the transmission congestion component of the LMP).

The generation loss component of the incremental cost can be derived as follows:

$LMIC_{i,t}^{loss} = -\alpha_{i,t} \lambda_t$ for EMS environment or $LMP_{i,t}^{loss} = -\alpha_{i,t} \lambda_t$ for market environment (the generation loss component of the LMP). Note that the generation loss sensitivity is related to generation penalty factor:

generation penalty factor = 1/(1−generation loss sensitivity).

For thermal units with allowed regions (ARs) and prohibited regions (PRs), the dispatch first attempt to assign economic basepoints that are not in any of the PRs; if not possible due to the fact that the PRs are two wide to cross over in one time interval, ensure that the PR is crossed as fast as possible and penalize the basepoint that falls within any of the PRs. Let the number of prohibited regions for a unit be $N_{pr}$. Typically the number of the ARs that are separated by these PRs is $N_{pr}+1$.

Figure 4:
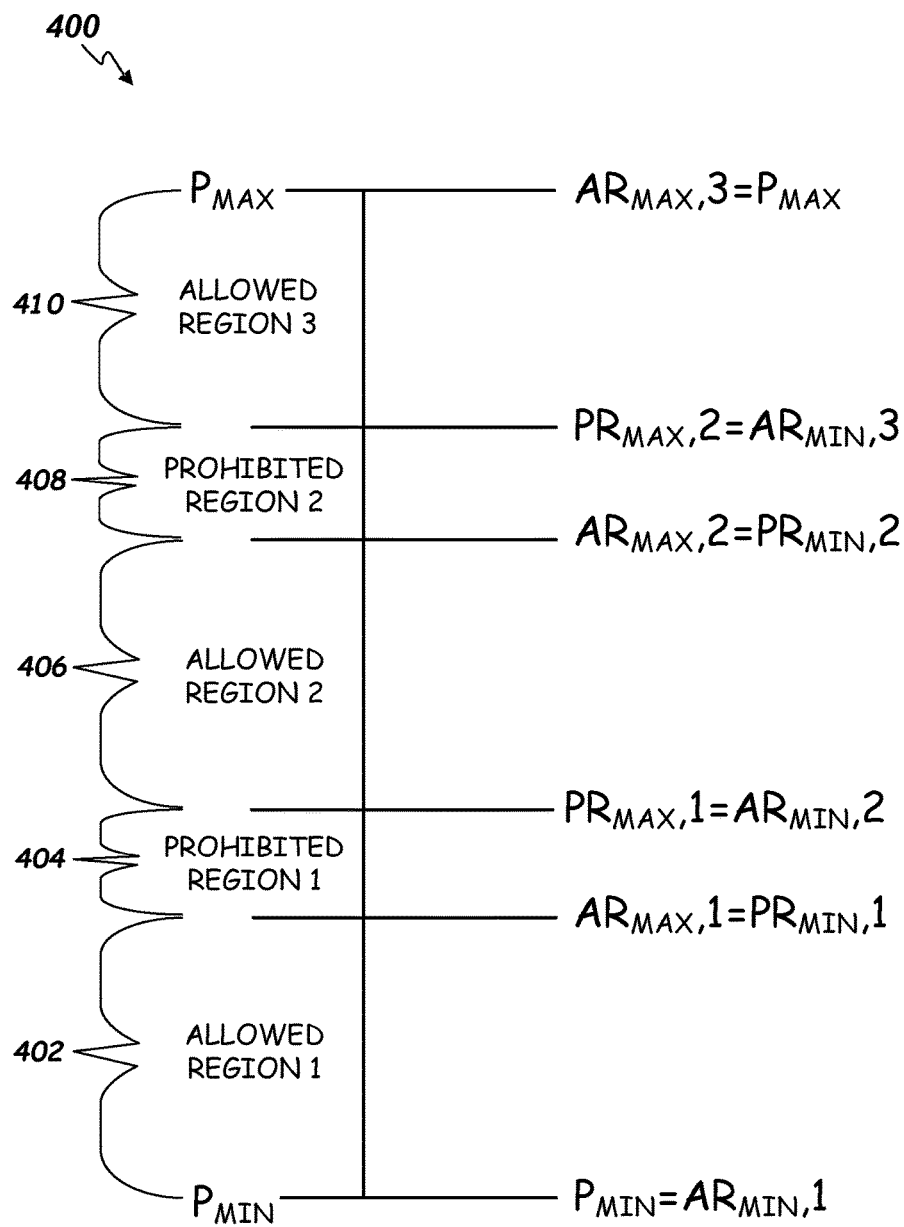
FIG. 4 is chart illustrating an example of operating regions of a generation resource according to embodiments of the present invention.

To help visualize the operating regions, FIG. 4 depicts a chart 400 illustrating an example of the operating regions of an example unit. The example unit has three ARs (i.e., power output operating ranges) labeled Allowed Region 1 402, Allowed Region 2 406, and Allowed Region 3 410. The example unit also has two PRs labeled Prohibited Region 1 404 and Prohibited Region 2 408 that are disposed between the ARs.

For dispatch purposes, only one of ARs is enabled; for commitment purpose, zero or one of ARs is enabled. The binary variable used to indicate if an AR is enabled for time interval t, unit i, allowed region m, is denoted by $AR_{m,i,t}$. Then $\Sigma_m AR_{m,i,t} = 1$ where $AR_{m,i,t} \in \{0,1\}$. For commitment, $\Sigma_m AR_{m,i,t} \leq 1$. If the unit can be dispatched inside one of the PRs, for instance, the PR is too wide with respect to the unit's ramp rate and the length of the time interval, then the above equation can be adjusted as follows:
For dispatch purposes, $\Sigma_m AR_{m,i,t} + \Sigma_n PR_{n,i,t} = 1$ where $AR_{m,i,t} \in \{0,1\}$ and $PR_{n,i,t} \in \{0,1\}$;
For commitment purposes, $\Sigma_m AR_{m,i,t} + \Sigma_n PR_{n,i,t} \leq 1$.

Two new constraints are introduced for each AR and for each time interval:
$AR_{m,i,t} P_{m,i}^{AR;Min} \leq P_{m,i,t}^{AR}$ and $P_{m,i,t}^{AR} \leq AR_{m,i,t} P_{m,i+1}^{AR;Max}$
where $P_{m,i,t}^{AR}$ denotes the dispatch MW in the AR m for unit i and time interval t.
$PR_{n,i,t} P_{n,i}^{PR;Min} \leq P_{n,i,t}^{PR}$ and $P_{n,i,t}^{PR} \leq PR_{n,i,t} P_{n,i+1}^{PR;Max}$
where $P_{m,i,t}^{AR}$ denotes the dispatch MW in the PR n for unit i and time interval t.

The total dispatch MW, denoted by $x_{i,t}$ in the above, is in one of the AR's or in one of the PR's, which are mutually exclusive of each other except for the boundaries Therefore, the following holds, $$x_{i,t} = \Sigma_m P_{m,i,t}^{AR} + \Sigma_n P_{n,i,t}^{PR}$$

To discourage the unnecessary dispatch of the unit inside a prohibited region, penalty is applied. This may be reflected in the objective function as an additive term like this: $+\Sigma_t \Sigma_i \Sigma_n \text{Penalty}_{n,i,t} \times PR_{n,i,t}$. If the same flat penalty is applied to all prohibited regions and all units and all time intervals, then this additive term may be rewritten as $+\text{Penalty}\Sigma_t \Sigma_i \Sigma_n PR_{n,i,t}$.

If there are restrictions on units with prohibited regions that demand the unit's should never be dispatched inside any of the prohibited regions. Then the above constraints are reduced to $$\Sigma_m AR_{m,i,t} = 1.$$

$AR_{m,i,t} P_{m,i}^{AR;Min} \leq P_{m,i,t}^{AR}$ and
$P_{m,i,t}^{AR} \leq AR_{m,i,t} P_{m,i+1}^{AR;Max}$.

$$x_{i,t} = \Sigma_m P_{m,i,t}^{AR}.$$

The SCDD application 201 utilizes the WPM database 206 as its repository. Both real-time users and study users are supported. The WPM database structure can include the following four data categories: static input data from an information model manager such as, for example, the Information Model Manager (IMM) manufactured by Siemens Industry, Inc. of Washington, D.C.; dynamic input data from the data transfer interface programs that collect the real-time measurements, schedules, calculated values and user input data; working data that has been pre-processed by the SCDD application to set up the formulation of the optimization model; and output data resulting from solving the optimization problem and SCDD post-processing including the optimal economic basepoints of all the participating economic units for all the time intervals in the dispatch horizon. The unit's economic basepoint for the binding time interval is updated to the real time AGC database.

The dynamic data from SCADA/AGC includes unit output mw, unit connection status, unit derated limits, unit operating mode, unit ramp rates, unit incremental heat rate (IHR) curves and capability curves, unit fuel selectors, unit fuel cost, unit penalty factors, control area's current load, control area's current net interchange, control area's regulation requirement, and control area's ancillary service requirements. The schedule data used from the Current Operating Plan (COP) includes unit outage schedules, unit derate schedules, unit energy bid price curves, unit ancillary service bid price curves, area net interchange schedule, and area load forecast. The critical constraint data used from the Transmission Network Application (TNA) includes a list of critical branch flow (and/or transmission corridor flow) constraints, constraint flow limits for the critical flow constraints, and unit shift factors.

Figure 5:
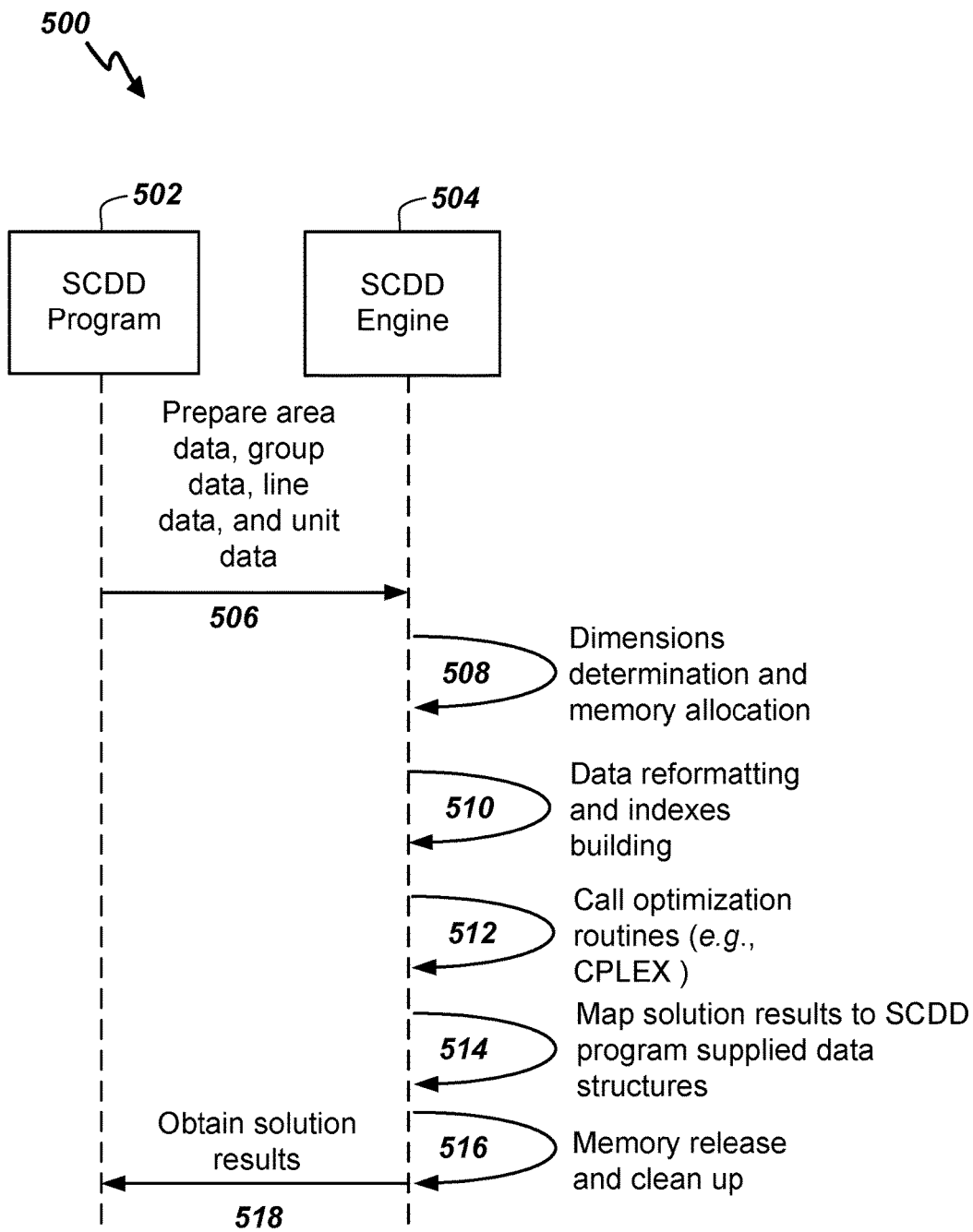
FIG. 5 is a sequence chart depicting an example method according to embodiments of the present invention.

Turning now to the sequence chart 500 of FIG. 5, in some embodiments, the SCDD application 201 can be implemented in two parts: a SCDD program 502 and a SCDD engine 504. The SCDD program 502 is operative to perform data pre-processing, prepare data in a form that can be accepted by the SCDD engine (506), obtain the solution results from the SCDD engine (518), and perform post-processing and storing of the results into the WPM database 206. The SCDD engine 504 can be implemented as a library routine that is callable from the SCDD program 502. The SCDD engine 504 receives various input data (506), determines dimensions and memory allocation (508), reformats the data and builds indexes (510); calls optimization routines (512) (e.g., using tools such as the CPLEX Optimizer manufactured by IBM Corporation), maps solution results to SCDD program 502 supplied data structures (514); releases and cleans up memory (516), and saves the solution results into the SCDD program 502 supplied output data structures (518).

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A method of controlling an energy delivery system having a windfarm including a plurality of wind powered electric generators, and further having a plurality of non-wind powered electric generators, the method comprising:

providing an energy management system (EMS) communicatively coupled to the plurality of non-wind powered electric generators and the plurality of wind powered electric generators, the EMS including a wind power management (WPM) system, the WPM system including a WPM application that includes a security constrained dynamic dispatch (SCDD) application;

receiving input data within the SCDD application, the input data including real time telemetry, schedule input data, and critical constraint data;

validating the input data for consistency to avoid infeasibilities, and to produce validated input data;

pre-processing the validated input data to determine a first set of parameters including a total generation amount to be dispatched and additional parameters;

formulating an optimization model based on the first set of parameters and one or more data structures storing the validated input data;

executing an optimization process on the optimization model to compute a solution;

post-processing the solution to determine economic basepoints for the windfarm and for the non-wind powered electric generators;

producing a setpoint for the windfarm, such that an amount of power from the wind powered electric generators that is put into the energy delivery system is maximized within a set of security constraints of the energy delivery system;

communicating the setpoint for the windfarm to a remote terminal unit at the windfarm;

operating the plurality of wind powered electric generators of the windfarm to generate power in accordance with the setpoint communicated to the remote terminal unit at the windfarm; and transmitting the amount of power from the wind powered electric generators via the energy delivery system.

2. The method of claim 1, wherein receiving input data includes receiving static and dynamic data from an interface to a supervisory control and data acquisition system, an interface to an automatic generation control (AGC) system, an interface to a Current Operating Plan database, and an interface to a transmission network application.

3. The method of claim 1, wherein validating the input data includes avoiding infeasibilities due to invalid input data.

4. The method of claim 1, wherein pre-processing the validated input data includes determining a list of wind powered electric generators and non-wind powered electric generators that will participate in dispatch, determining operating modes of the wind powered electric generators and non-wind powered electric generators for each time interval of a dispatch horizon, determining dispatch limits, determining ramp rates, determining resulting cost curves, determining initial outputs, and determining network critical constraints to be considered during dispatch.

5. The method of claim 1, wherein formulating the optimization model includes mapping data structures within the SCDD application to the optimization model.

6. The method of claim 1, wherein formulating the optimization model includes building an objective function and constraints based on the first set of parameters and the data structures storing the validated input data.

7. The method of claim 1, wherein post-processing the solution includes publishing the economic basepoints to a WPM database and to a real time AGC database.

* * * * *